(12) United States Patent
Nakamura

(10) Patent No.: US 7,209,306 B2
(45) Date of Patent: Apr. 24, 2007

(54) RECORDING MEDIUM, RECORDING METHOD, AND RECORDING/REPRODUCING DEVICE

(75) Inventor: Osamu Nakamura, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/477,916

(22) PCT Filed: Mar. 12, 2003

(86) PCT No.: PCT/JP03/02926

§ 371 (c)(1),
(2), (4) Date: Nov. 18, 2003

(87) PCT Pub. No.: WO03/079351

PCT Pub. Date: Sep. 25, 2003

(65) Prior Publication Data

US 2004/0169948 A1    Sep. 2, 2004

(30) Foreign Application Priority Data

Mar. 19, 2002   (JP) .............................. 2002-076217

(51) Int. Cl.
   *G11B 5/09*   (2006.01)
(52) U.S. Cl. ......................................... 360/48; 360/53
(58) Field of Classification Search ................ 360/48, 360/72.1, 72.2, 18, 55
   See application file for complete search history.

(56) References Cited

U.S. PATENT DOCUMENTS

| 5,712,740 | A  | * | 1/1998  | Kikuchi et al. ................ 360/48 |
| 5,949,598 | A  |   | 9/1999  | Honsho et al. |
| 6,307,700 | B1 | * | 10/2001 | Takayama .................. 360/72.2 |
| 2001/0036029 | A1 | * | 11/2001 | Nishio et al. ............... 360/72.1 |

FOREIGN PATENT DOCUMENTS

| EP | 0 736 869 | 10/1996 |
| JP | 64-70965  | 3/1989  |
| JP | 8-279250  | 10/1996 |
| JP | 9-139029  | 5/1997  |

* cited by examiner

*Primary Examiner*—Andrea Wellington
*Assistant Examiner*—Varsha A. Kapadia
(74) *Attorney, Agent, or Firm*—Frommer Lawrence & Haug LLP; William S. Frommer; Thomas F. Presson

(57) ABSTRACT

As a tape recording format, tracks are formed by a succession of block units, and a data unit called a group is formed by data of size equivalent to a predetermined plurality of tracks. Using this format, a base group number indicating the group to which the current track physically belongs is recorded in the ID information for a track, and the lower four bits or similar of a group number indicating the group to which the current block logically belongs is recorded within a block. By this means, even if rewriting is performed in block units and a recorded state results in which the blocks of a plurality of groups are intermixed within a track, the group to which each block belongs can be correctly identified during reproduction.

6 Claims, 11 Drawing Sheets

FIG. 5

| Lower 4 Bits of Data Block Number | Contents of ID Information |
|---|---|
| 0000 | Partition Number |
| 0001 | Data Format |
| 0010 | Absolute Track Number (ATN) |
| 0011 | Append ATN |
| 0100 | Base Group Number |
| 0101 | Record Count |
| 0110 | Separator 1 Count |
| 0111 | Separator 2 Count |
| 1000 | Last ATN of Previous Group (LATNPG) |
| 1001 | GIT Size of Current Basic Group |
| 1010 ~ 1111 | Undefined |

RECORDING MEDIUM, RECORDING METHOD, AND RECORDING/REPRODUCING DEVICE

TECHNICAL FIELD

The present invention relates to a recording medium in which data are recorded on a magnetic tape, and a recording method and a recording and reproduction apparatus corresponding to recording onto such recording medium.

BACKGROUND ART

So-called tape streamer drives have been known as drive apparatuses capable of performing recording/reproduction of digital data on magnetic tape. Such tape streamer drives have enormous storage capacities of, for example, from several tens to several hundreds of gigabytes, depending on the tape length of the tape cassette media. Consequently such drives are utilized in a wide range of applications, such as backups of the data recorded on the hard disk or other media of computers, and are also well-suited to storage of image and other data with large data sizes.

In such tape streamer drives, the magnetic tape is made to travel with the tape wound over a rotating drum through a predetermined wrap angle; in addition, the rotating drum is rotated, and by using a magnetic head on the rotating drum to perform recording/reproduction scanning using a helical scan method, high-density recording can be performed. Hence as is well known, data are recorded such that there are successive tracks in the length direction on the magnetic tape, formed so as to have a predetermined inclination angle with respect to the length direction.

In a tape streamer drive as described above, as the format of data recorded on the magnetic tape, for example, a format such as the following has been stipulated.

First, one track is formed as a succession of a predetermined plurality of data units called blocks. A block comprises a header, and user data and parity areas following thereafter.

Further, a fixed-length data unit called a group is stipulated. A group is a data unit formed by an aggregate of data recorded on a predetermined plurality of successive tracks, and is handled as a unit of data recording and reproduction within a tape streamer drive. For example, addition of error correction codes during recording, and error correction processing during reproduction, are performed so as to conclude within a group.

Within a block header, there is provided an area for storing ID information. In this ID information area, different types of information are successively allocated and stored in successive blocks within a track, and this successive allocation is repeated. As one among a plurality of information types used as this ID information, group identification information indicating the group to which the current track belongs is defined. Hence the group identification information within a given track is not stored in all blocks, but is stored in, for example, every block after a predetermined number of blocks, according to the number of information types used as ID information.

Even if group identification information is thus stored in every block after a number of blocks, if the group identification information is read from a certain block, the group of a track which is formed including the block can be identified. That is, the group to which the track belongs can be identified.

Hereupon, in the case of a format as described above, as the ID information inserted into the header for each block, one of the various information types is used. Since for such a format it is not necessary to insert all ID information types into all blocks, header data sizes can be smaller, and therefore there is the advantage that to this extent a greater quantity of user data can be recorded.

However, in a single track, ID information of one certain type is not written to all blocks, so that it must be assumed that all the blocks forming one track have common ID information. As a result, for example, the following problem occurs.

For example, in a tape streamer drive, an operation called read-after-write (RAW) is performed during recording to monitor in block units whether data recording to the magnetic tape has been performed correctly. If recording has not been performed correctly, rewriting is performed. That is, the track containing the data for the block is again recorded in another position.

A problem here is that, as explained above, it must be assumed that all the blocks forming one track have common ID information.

Consequently even if recording was not correctly completed for only one block in a given track, the entire track including the block must be rewritten. In this case, a several number of tracks, from the track containing the block in which the recording error occurred to the track recorded immediately before the rewrite, become dummy tracks. If a plurality of dummy tape portions occur over tracks, the recording capacity of the tape as a whole is reduced. Hence it is desired that read-after-write operations be performed efficiently, such that consumption of the magnetic tape be minimized. Also, when rewriting occurs near a group boundary, after writing tracks in the next group, it may be necessary to rewrite data of tracks in the previous group. In this case, the tracks in the previous group and the tracks in the following group are intermixed in unspecified order.

For example, in the current format, group boundaries can only be identified by reading group identification information recorded intermittently in tracks. However, in a state such as described above in which previous and following groups are intermixed, it is difficult for the tape streamer drive to recognize the track positions which actually delimit groups. The possibility of occurrence of recording and reproduction errors is increased, and to this extent, reliability is degraded.

Thus, with the current ID information format, there are disadvantages such as constraints on rewrite operations, and situations in which the tracks forming a single group are separated and not in succession.

DISCLOSURE OF THE INVENTION

Therefore, in light of the above problems, in this invention a recording medium, which is magnetic tape on which data are recorded, is configured as follows.

As the format of data recorded onto the recording medium, data are recorded so as to form tracks consisting of a plurality of blocks, and in addition, groups which are recording and reproduction data units corresponding to a predetermined plurality of tracks, are stipulated.

Furthermore, the recording medium is provided in which physical group identification information, indicating the group to which the current track physically belongs, is recorded within track data, and logical group identification information, employing a fewer number of bits than the physical group identification information to indicate the group to which the current block logically belongs, is recorded within blocks.

Further, a recording method to record data onto magnetic tape is configured as follows.

In a recording method of this invention, it is assumed that data are recorded so as to form tracks consisting of a plurality of blocks, and in addition, groups which are recording and reproduction data units corresponding to a predetermined plurality of tracks are stipulated.

Further, when recording is performed, physical group identification information, indicating the group to which the current track physically belongs, is stored within track data, and logical group identification information, employing a fewer number of bits than the physical group identification information to indicate the group to which the current block logically belongs, is stored within blocks.

In addition, a recording and reproduction apparatus to record data onto magnetic tape is configured as follows.

In a recording and reproduction apparatus according to this invention, it is assumed that data are recorded so as to form tracks consisting of a plurality of blocks, and in addition, groups which are recording and reproduction data units corresponding to a predetermined plurality of tracks are stipulated.

Furthermore, recording means are provided which records physical group identification information, indicating the group to which the current track physically belongs, so as to be stored within track data, and which records logical group identification information, employing a fewer number of bits than the physical group identification information to indicate the group to which the current block logically belongs, so as to be stored within blocks.

According to each of the above configurations, data are recorded on the magnetic tape in tracks consisting of a plurality of blocks, and data of a predetermined plurality of tracks is handled as a group unit. Further, in addition to recording physical group identification information in a track indicating the group to which the current track physically belongs on the magnetic tape, logical group identification information is also stored in blocks to indicate the group to which the current block logically belongs.

For example, if physical group identification information alone is recorded, group attributes can only be set with tracks as the smallest units. That is, all blocks within the same track can only be handled as belonging to the group indicated by the physical group identification information recorded in the track.

On the other hand, if logical group identification information is recorded, as in this invention, group attributes can be set with blocks as the smallest units.

BRIEF DESCRIPTION OF DRAWINGS

FIG. 5 is a diagram showing the defined contents of information stored in ID information;

BEST MODE FOR CARRYING OUT THE INVENTION

An embodiment of the present invention is hereinafter explained, referring to the attached drawings.

Figure 1:
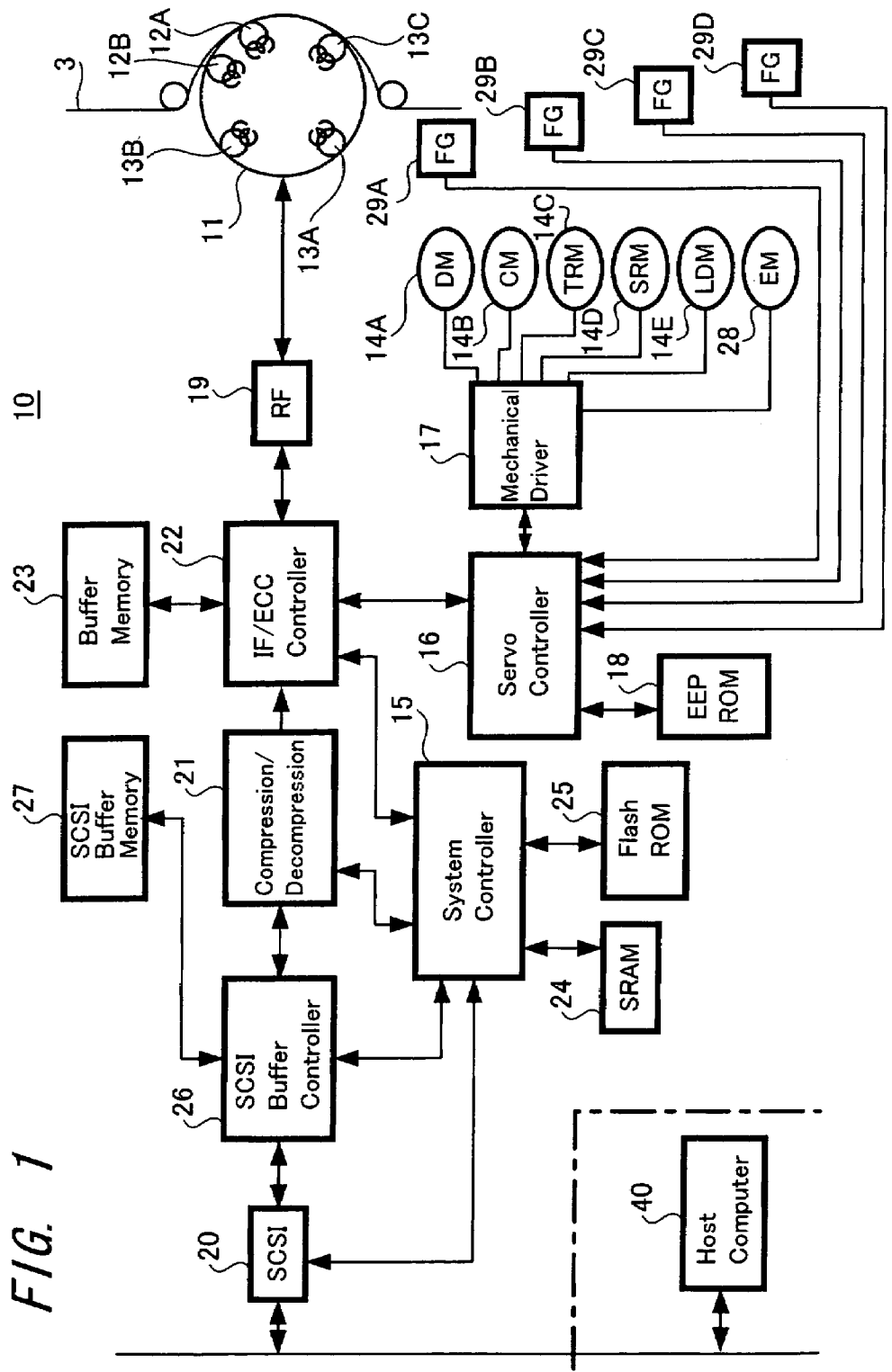
FIG. 1 is a block diagram showing an example of the configuration of a tape streamer drive corresponding to an embodiment of the present invention.

FIG. 1 shows an example of the configuration of a tape streamer drive corresponding to the embodiment of the present invention.

A tape streamer drive 10 shown in the figure is designed to perform recording and reproduction by the helical scan method on a magnetic tape 3 in a tape cassette, not shown in the figure.

In this figure, a rotating drum 11 is provided with, for example, two recording heads 12A, 12B and three reproducing heads 13A, 13B, 13C.

The recording heads 12A, 12B have a construction in which two gaps, with different azimuth angles, are positioned in close proximity. The reproducing heads 13A, 13B, and 13C also each have predetermined azimuth angles.

The rotating drum 11 is rotated by a drum motor 14A, and in addition magnetic tape drawn out from the tape cassette is wound about the rotating drum 11. The magnetic tape 3 is fed by a capstan motor 14B and by a pinch roller, not shown in the figure. Further, the magnetic tape 3 is wound around a T reel and S reel, not shown; the T reel and reel are rotated in the forward and reverse directions respectively by reel motors 14C and 14D respectively.

A loading motor 14E drives the loading mechanism, not shown, to execute loading and unloading of the magnetic tape 3 onto and from the rotating drum 11.

An eject motor 28 is a motor which drives the tape cassette loading mechanism, and executes operations to seat an inserted tape cassette and to eject a tape cassette.

The drum motor 14A, capstan motor 14B, reel motors 14C and 14D, loading motor 14E, and eject motor 28 are each driven to rotate by power applied from a mechanical driver 17. The mechanical driver 17 drives respective motors based on control from the servo controller 16. The servo controller 16 controls the rotation speed of respective motors, to execute tape feed during normal recording and reproduction, high-speed tape feed during high-speed reproduction, tape feed during fast-forwarding and rewinding, and other operations.

Further, in an EEP-ROM 18 constants and so on used by the servo controller 16 to perform servo control on the respective motors are stored.

In order for the servo controller 16 to execute servo control of respective motors, FGs (frequency generators) are provided in each of the drum motor 14A, capstan motor 14B, T reel motor (take-up reel motor) 14C, and S reel motor (supply reel motor) 14D, so that rotation information for each motor can be detected. That is, a drum FG 29A which generates frequency pulses in synchronization with the rotation of the drum motor 14A, a capstan FG 29B which generates frequency pulses in synchronization with the rotation of the capstan motor 14B, a T reel FG 29C which generates frequency pulses in synchronization with the rotation of the T reel motor 14C, and an S reel FG 29D which generates frequency pulses in synchronization with the rotation of the S reel motor 14D, are formed, and outputs (FG pulses) thereof are supplied to the servo controller 16.

By judging the rotation speeds of each motor based on these FG pulses, the servo controller 16 detects errors in the rotation operation of each motor relative to the target rotation speed, and by controlling the power to be applied by the mechanical driver 17 corresponding to the amount of errors, closed-loop rotation speed control can be realized. Hence during various operations such as normal feed during recording and reproduction, high-speed searches, fast-forward and rewind, the servo controller 16 can exercise control such that each of the motors rotates at the target rotation speed according to the operation.

Further, the servo controller 16 is bi-directionally connected, via an interface controller/ECC formatter 22 (hereafter called an IF/ECC controller), to a system controller 15 which executes control processing of the entire system.

In this tape streamer drive 10, an SCSI interface 20 is used for data input and output. For example, during data recording, data are sequentially input from the host computer 40 via the SCSI interface 20 in transfer data units called fixed-length records, and are supplied to a compression/decompression circuit 21 via a SCSI buffer controller 26. The SCSI buffer controller 26 is designed to control data transfer by the SCSI interface 20. An SCSI buffer memory 27 is buffer means provided, in conjunction with the SCSI buffer controller 26, to attain the transfer rate of the SCSI interface 20. The SCSI buffer controller 26 supplies requiring command data to a remote memory interface 30, described later on, and also generates an operating clock for the remote memory interface 30.

Further, in such a tape streamer drive system, there also exists a mode in which data are transmitted from the host computer 40 in a unit of aggregate data having variable length.

In the compression/decompression circuit 21, if necessary, compression processing of input data can be performed using a predetermined method. The output of the compression/decompression circuit 21 is supplied to the IF/ECC controller 22; in the IF/ECC controller 22, the output of the compression/decompression circuit 21 is temporarily accumulated in a buffer memory 23 under the control of the IF/ECC controller 22. Under the control of the IF/ECC controller 22, data accumulated in this buffer memory 23 are ultimately handled as data in fixed-length units, equivalent to 40 tracks of data, called a group, on the magnetic tape, and the data are subjected to ECC format processing.

As ECC format processing, error correction codes are appended to the recording data, and in addition modulation processing of the data is performed as compatible with magnetic recording, and the result is supplied to a RF processing portion 19.

In the RF processing portion 19, amplification, recording equalizing and other processing are performed on the supplied recording data to generate a recording signal, which is supplied to the recording heads 12A and 12B. Thus, data recording onto the magnetic tape 3 is performed by the recording heads 12A and 12B.

As a simplified explanation of the data reproduction operation, the recorded data on the magnetic tape 3 are read as RF reproduction signals by the reproducing heads 13A and 13B, and the reproduction output is subjected to reproduction equalizing, reproduction clock generation, binary conversion, decoding (for example, Viterbi decoding), and other processing by the RF processing portion 19.

A signal read in this manner is supplied to the IF/ECC controller 22, and first error correction processing and similar is performed. After temporarily accumulated in the buffer memory 23, the data are read at a predetermined time and are supplied to the compression/decompression circuit 21.

In the compression/decompression circuit 21, if, based on the judgment of the system controller 15, the data have been subjected to compression by the compression/decompression circuit 21 at the time of recording, data decompression processing is performed; if the data are uncompressed, data decompression processing is not performed, and the data are output without expanding processing.

The output data from the compression/decompression circuit 21 are output to the host computer 40 as reproduction data via the SCSI buffer controller 26 and SCSI interface 20.

In an S-RAM 24 and a flash ROM 25, data used by the system controller 15 to perform various processing are stored.

For example, constants and similar parameters used for control are stored in the flash ROM 25. The S-RAM 24 is used as working memory, and is employed as memory for storing and computing data read from MIC (remote memory chip 4, contact memory 104), data for writing to MIC, mode data set in tape cassette units, and various flag data.

In the flash ROM 25, programs to be executed by the system controller 15 and various data used as other firmware are also stored.

The S-RAM 24 and flash ROM 25 may be configured as internal memory of a microcomputer constituting the system controller 15, or a configuration may be employed in which a portion of the buffer memory 23 is used as working memory.

As shown in FIG. 1, information is transmitted in both directions between the tape streamer drive 10 and host computer 40 via the SCSI interface 20 as described above; to the system controller 15 the host computer 40 uses SCSI commands to perform various communication.

A configuration may be employed in which a data interface other than SCSI, such as for example an IEEE 1394 interface, is adopted.

Previously, this applicant also proposed a configuration in which non-volatile memory capable of storing magnetic tape management information and similar is provided on a tape cassette, and a tape streamer drive can access this non-volatile memory by a contact or a non-contact method. In this embodiment, such a tape streamer drive configuration may be adopted.

Figure 2:
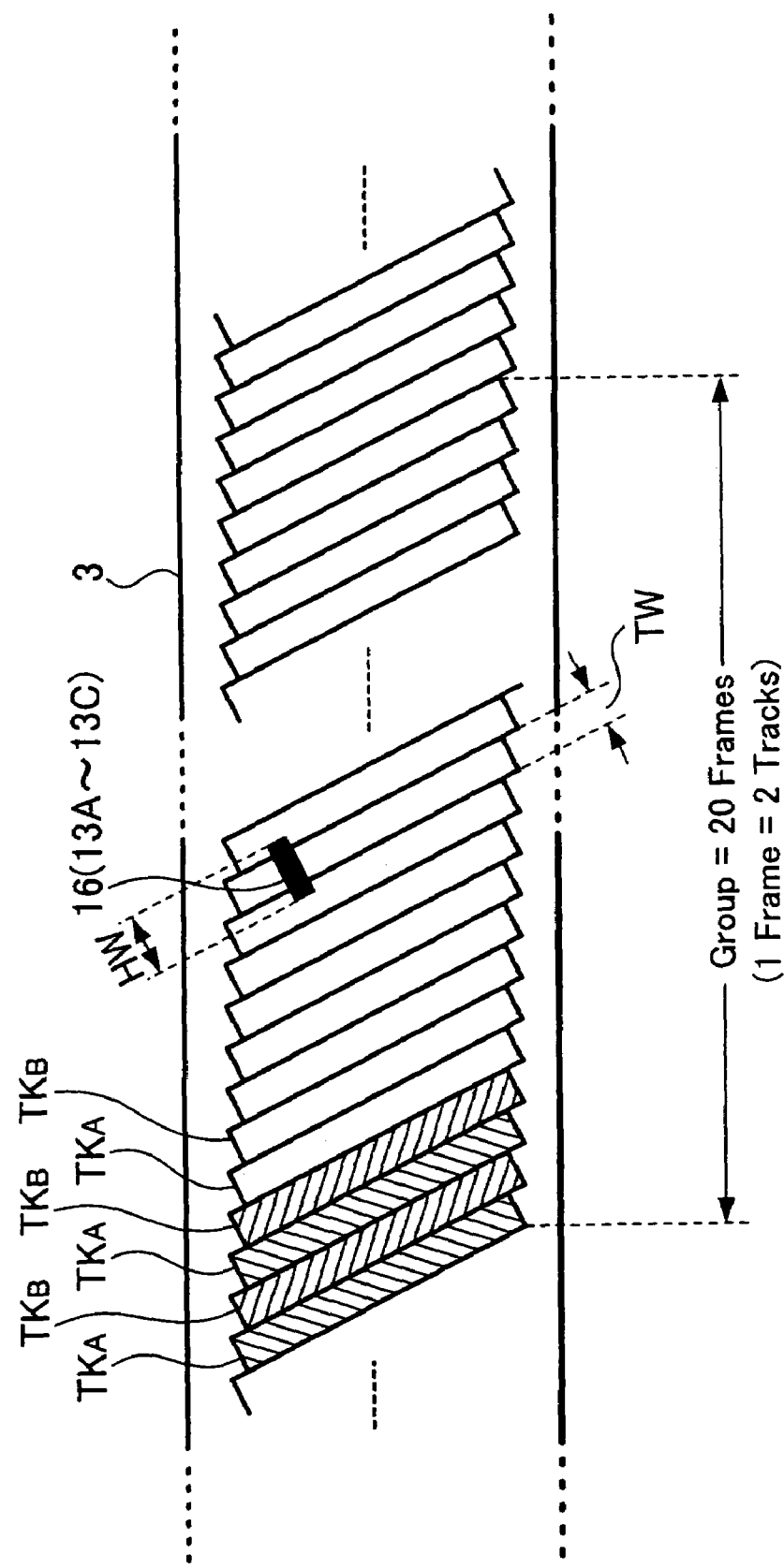
FIG. 2 is an explanatory diagram showing the format of a track recorded on magnetic tape.

FIG. 2 shows the structure of a track recorded on magnetic tape 3 by the above tape streamer drive 10.

Each track is formed as a track of track width TW through azimuth recording by a recording head, not shown. Adjacent tracks are made to be reverse azimuth tracks to each other. In other words, tracks TKA having one azimuth direction and tracks TKB having the other azimuth direction are formed alternately.

During reproduction, tracks are scanned by the reproducing head 16. The head width HW of the reproducing head 16 is wider than the track width TW, but due to the so-called azimuth effect, crosstalk from adjacent tracks is prevented.

In a tape format corresponding to the embodiment of the present invention, a pair of adjacent tracks TKA, TKB is called one frame, and 20 frames (40 tracks) constitute a unit called a group.

The above-described group is the smallest recording unit. Hence one recording operation, called streaming, can be performed for one group as a minimum.

Figure 3:
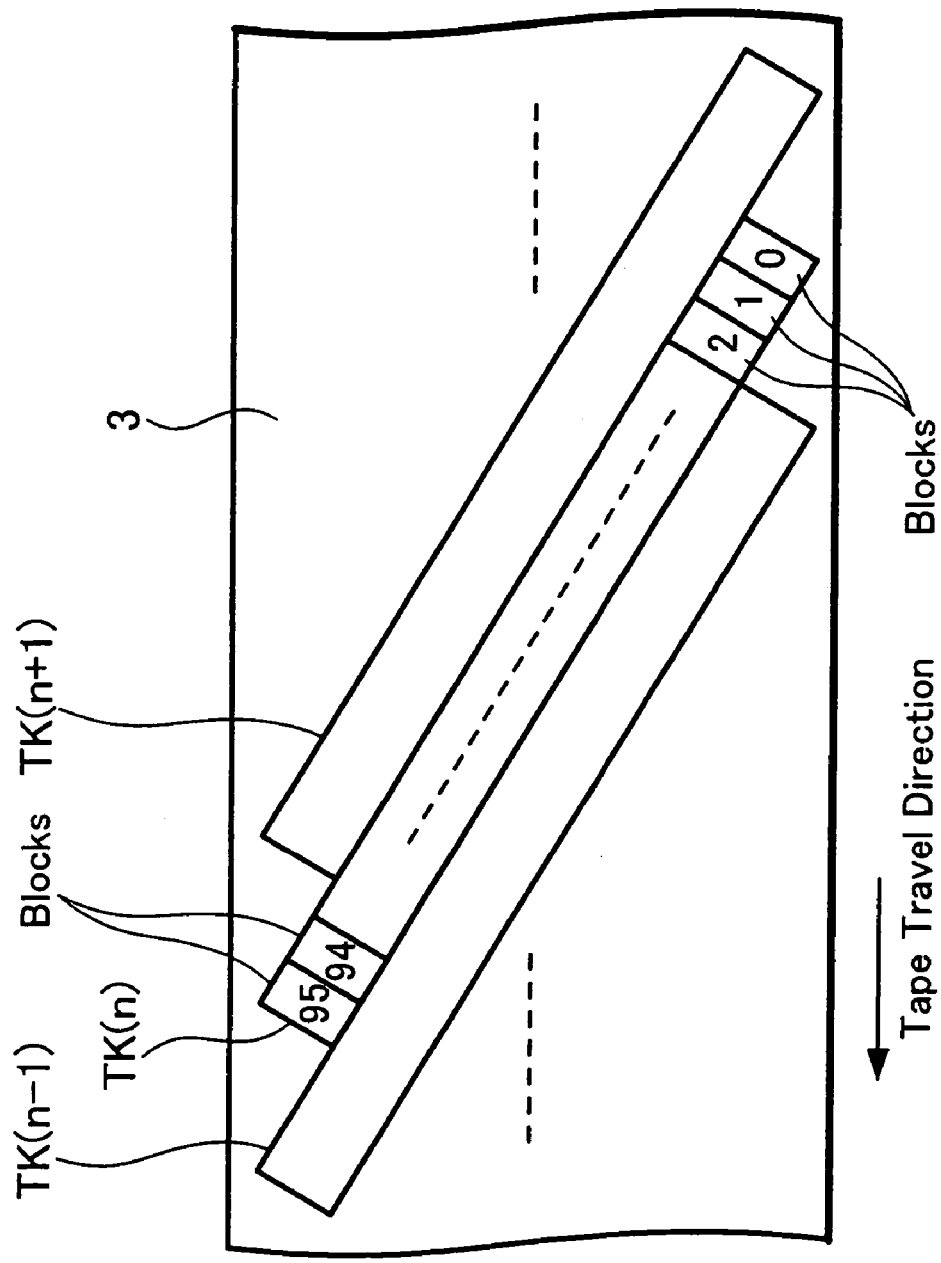
FIG. 3 is an explanatory diagram which schematically shows the data structure of a track.

The data format for individual tracks is shown in FIG. 3. One track consists of an aggregate of 96 blocks, in which, for example, fragment IDs from 0 to 95 are provided in sequence. These blocks are of fixed length, with predetermined data size.

Figure 4:
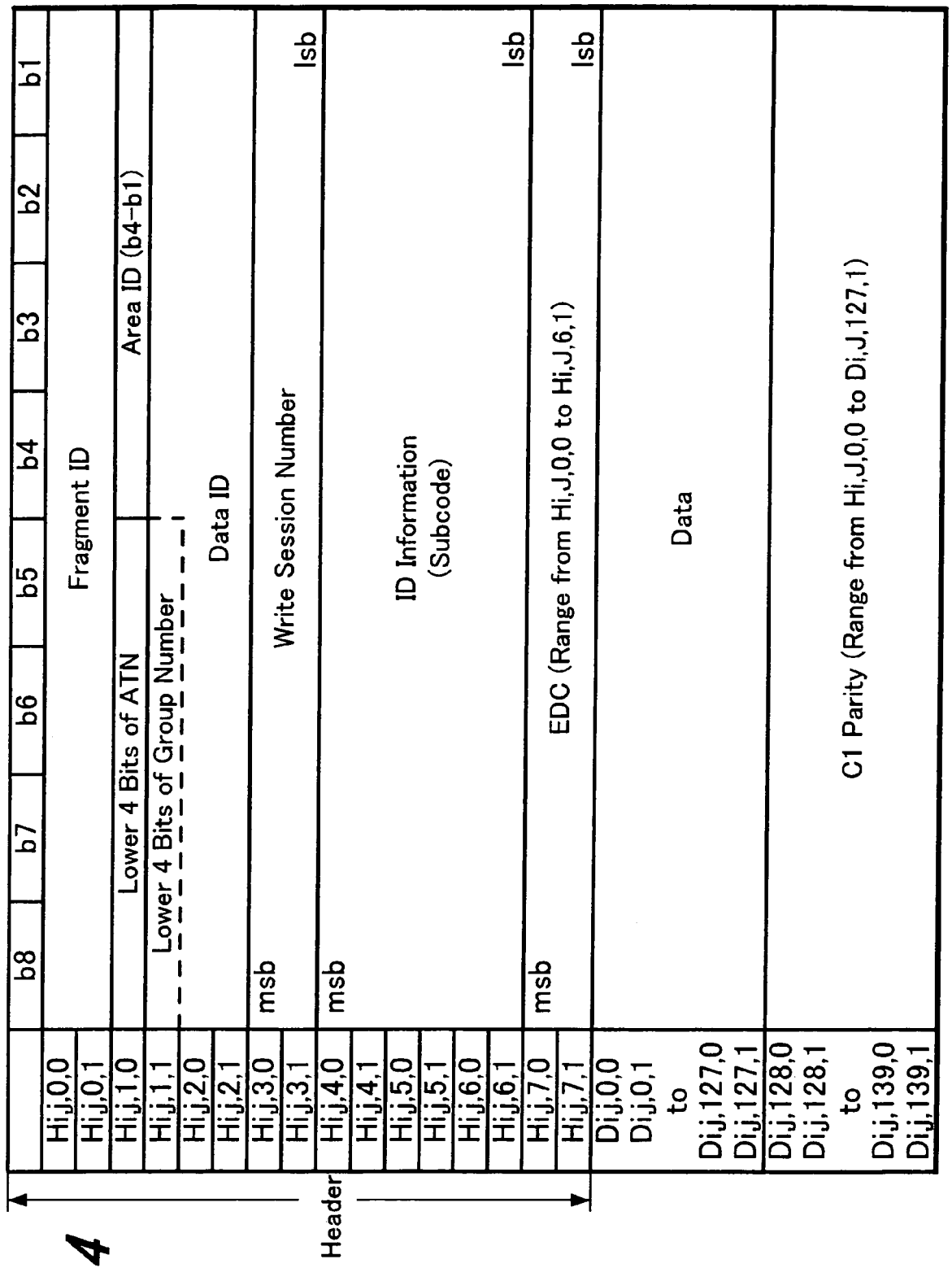
FIG. 4 is a diagram showing the data structure of a block.

The block data structure is shown in FIG. 4.

As shown in the figure, a block consists of a leading 16-byte header area, a following 128×2=256 byte data area, and a 12×2=24 byte C1 parity area. The C1 parity area is an error correction code for the data in the block. Though details are not explained here, C2 parity and C3 parity are also defined in the format in the embodiment of the present invention. The C2 parity is an error correction code which concludes within a track unit and the C3 parity is the one which concludes within a group unit.

In the header area of the block shown in FIG. 4, a fragment ID is stored in the area of the leading two bytes (Hi,j,0,0/Hi,j,0,1).

As shown in FIG. 3, sequential numbers are assigned to blocks positioned in sequence in a track, and a value from 0 to 95 is stored in the fragment ID.

The value of the lower four bits of the ATN (absolute track number) is stored in the upper four bits of the third byte (Hi,j,1,0). That is, the lower four bits indicate the value of the absolute track number of the track to which the current block belongs.

An area ID is stored in the lower four bits of the third byte (Hi,j,1,0). The actual value set in the area ID indicates whether the area to which the current block belongs is, for example, a device area, a reference area, a system area, a data area, or an EOD (end of data) area.

The three-byte area from the fourth to the sixth bytes (Hi,j,1,1 to Hi,j,2,1) is a logical address area. The value of the lower four bits of the group number is stored in the upper four bits of the fourth byte as the logical address. The lower four bits of the group number indicate the lower four bits of a group number value indicating the group to which the current block logically belongs.

In the logical address area, a data ID value is stored as the logical address in the area comprising the remaining lower four bits of the fourth byte, and the fifth and sixth bytes. The data ID indicates the logical data position within the group to which the current block logically belongs.

A write session number value is stored in the two-byte area comprising the seventh and eighth bytes (Hi,j,3,0/Hi,j,3,1).

The six-byte area of the succeeding ninth through 14th bytes (Hi,j,4,0/Hi,j,6,1) is an ID information (sub code) area. One type among a predetermined plurality of types of data is stored in this ID information area, according to predetermined rules stipulated by the format.

FIG. 5 shows examples of types of information stored as the above ID information.

According to this figure, the value stored as ID information is defined as follows, according to the lower four bits of the data block number for the current block.

When the lower four bits of the data block number are "0000", a Partition Number to identify the partition to which the current block belongs is stored in the ID information.

When the lower four bits of the data block number are "0001", the data format for the current block is stored.

When the lower four bits of the data block number are "0010", the ATN (Absolute Track Number) of the track including the current track is stored.

When the lower four bits of the data block number are "0011", the append ATN value is stored.

When the lower four bits of the data block number are "10100", the value of the Base Group Number is stored. The value of the Base Group Number indicates, as the physical position on the magnetic tape, the group to which the current block belongs.

When the lower four bits of the data block number are "0101", the record count is stored. The record count indicates the record number of the current block.

When the lower four bits of the data block number are "0110", a separator 1 count is stored.

When the lower four bits of the data block number are "0111", a separator 2 count is stored.

When the lower four bits of the data block number are "1000", the LATNPG (Last ATN of the Previous Group) is stored. Here the PG (previous group) is the group preceding by one the current group to which the current block logically belongs. The LATNPG is a value indicating the final track among the tracks of data recorded to logically form the previous group.

When the lower four bits of the data block number are "1001", the GIT size of the current basic group is stored.

Data block numbers, the lower four bits of which are between 1010 and 1111 are undefined.

In this manner, the type of information stored in the ID information differs according to the data block number. Because the information type corresponds to the lower four bits of the data block number, each type of ID information can be stored so as to be allocated once for 16 blocks.

In this embodiment, a single track consists of 96 blocks, and because 96/16=6, each of the types of ID information listed in FIG. 5 is repeatedly recorded six times within one track.

As a rule, the information indicated by each information type stored as this ID information is common to all blocks forming the track which includes the current block. Consequently even if each type of information in the ID information is stored only once in 16 blocks as described above, the information may be applied to all the blocks forming the current track, so that recorded data can be managed appropriately based on the contents of the ID information.

Also, there is no longer a need to store all types of ID information in each block, so that the size of the ID information in each block fits into six bytes. That is, by securing a data area of this size without further increasing the data size of the header area in blocks, redundancy is reduced insofar as possible. In other words, the recordable capacity of user data within a given quantity of data is secured with maximum efficiency. Then, in a tape streamer drive system, an operation called read-after-write (RAW) is executed. For reference, FIG. 6 and FIG. 7 are used to explain read-after-write operation examples in the prior art.

Figure 6:
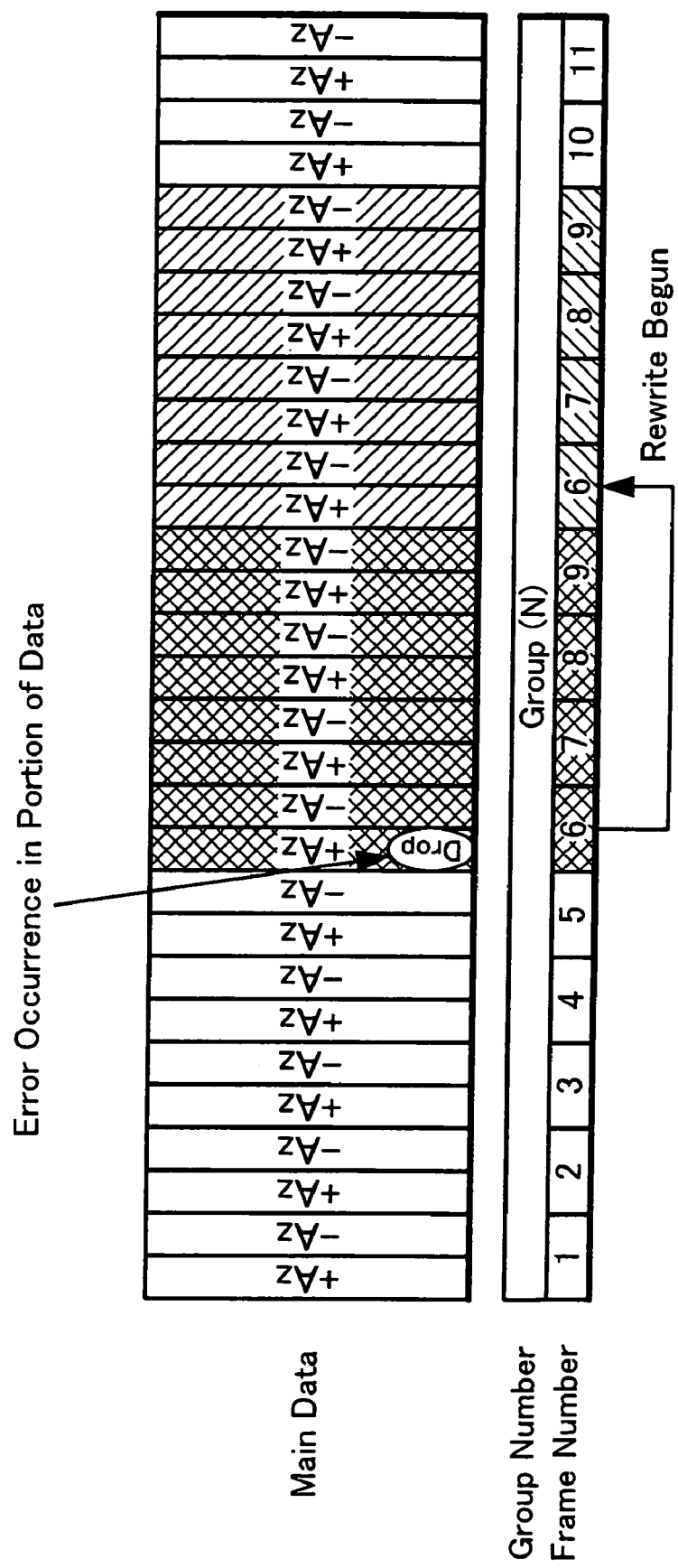
FIG. 6 is an explanatory diagram showing an example of rewrite operation in the prior art.
Figure 7:
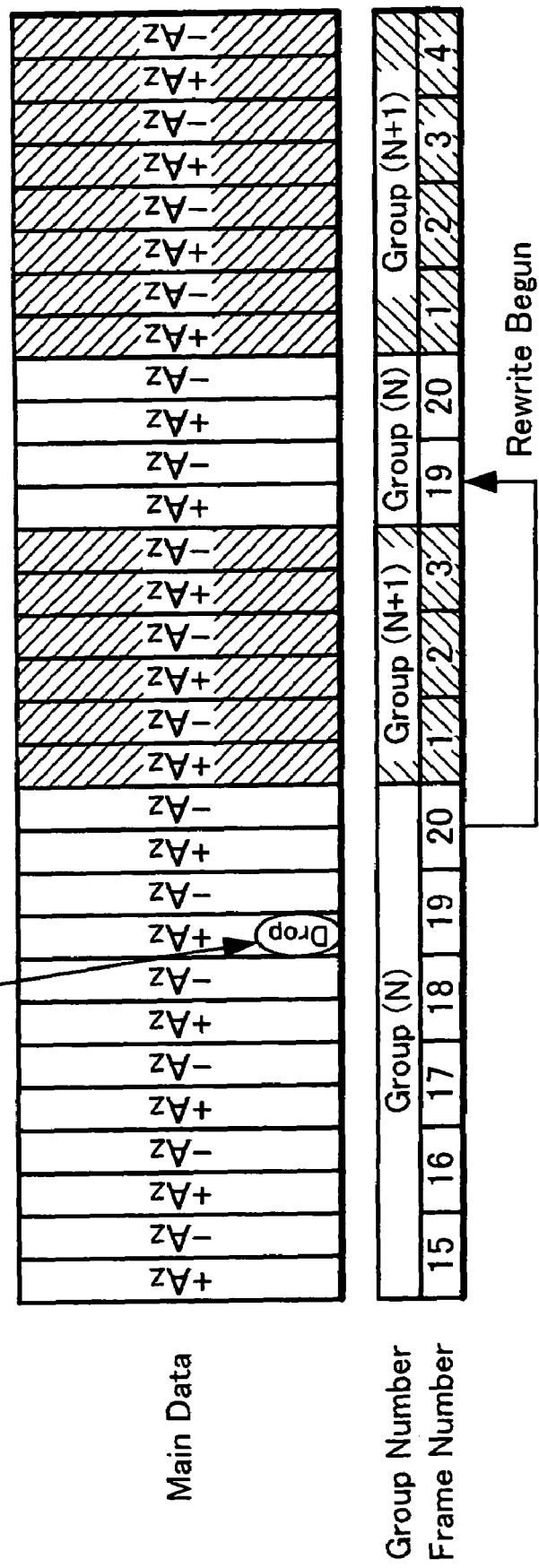
FIG. 7 is an explanatory diagram showing an example of rewrite operation in the prior art.

FIG. 6 schematically illustrates a case in which read-after-write is performed within what is assumed to be the same group.

Suppose that, for example, the group indicated by ID information within a block is group (N), and that main data are recorded on the track in sequence from frame number 1. As explained above, a frame is formed of two consecutive tracks, so that here one frame is formed of a positive-azimuth track (+Az) and an adjacent negative-azimuth track (−Az). As shown in the figure, suppose further that, at the time that frame 6 is recorded, a partial recording error occurs in the positive-azimuth track (+Az) of frame 6.

Read-after-write is executed in response to the error; however, a certain time interval is required until rewriting is begun after the tape streamer drive reads the data and detects the recording error. Consequently rewriting is executed after there has been a certain degree of progress in recording beyond the track in which the recording error has occurred. In the figure, after the recording error occurs in frame 6, at the end of recording up to frame 9, rewriting is begun.

As the rewrite operation in this case, in succession to the above frame 9, data are re-recorded in track units once again from frame 6. As a result of performing this rewriting, the dummy data not to be used are the data in four frames, which are the frame 6 in which the recording error occurred, and the succeeding frames 7, 8 and 9.

FIG. 7 schematically shows an example in which rewriting is performed as a result of read-after-write in the vicinity of a position at which groups change. In this case, a state is shown in which first the previous group (N) had been recorded in sequence, and then a partial recording error occurred in the positive azimuth track (+Az) of frame 19 in the group (N). In this case, the final frame of the group (N), frame 20, is recorded, and in addition recording of frames 1, 2 and 3 in the next group (N+1) ends before rewriting is begun. Here the rewriting is begun from frame 19 of group (N), and after frame 20 of group (N) is then written, recording is performed in sequence from frame 1 of the next group (N+1). In this case, there are five frames of dummy data, namely the frame 19 of group (N) in which the recording error occurred, the succeeding frame 20 of group (N), and frames 1, 2 and 3 of group (N+1).

However, the read-after-write operations illustrated in the above FIG. 6 and FIG. 7 have such problems, for example, as follows.

As is seen from FIG. 6 and FIG. 7, in read-after-write operation a considerable amount of time elapses from the occurrence of a recording error until the initiation of rewriting, and during this interval recording operation continues. In addition, the rewrite operation is performed in track units, by a procedure in which data recording is resumed from the track (frame) having the recording error.

Consequently even if an error occurs only in a portion of a track in which a recording error occurs, the entire track is treated as dummy data.

Further, even if no error occurs in the track recorded in succession to a track in which a recording error has occurred, after rewriting is performed, the error-free subsequent track will be treated as dummy data. Thus in the prior art the size of dummy data caused by rewrite operations is large compared with the size of data at the portion at which a recording error occurs, and to this extent, it can be said that a large amount of recordable data capacity is consumed.

As shown in FIG. 7 in particular, when rewriting is performed near a group boundary, there is the possibility that tracks are not in succession for each group, but are partially interchanged.

In prior art, the group to which the current track belonged was judged solely on the basis of the group number in the ID information shown in FIG. 5. Because each of the information types of the ID information is stored, for example, only once in 16 blocks, in some cases reading may not be successful. In such cases, it may for example be difficult to accurately recognize tracks at group boundaries, and there is the possibility that appropriate recording and reproduction operation will be impeded.

Hence the present applicant proposes a configuration in which rewriting is not performed in track units, but is performed in block units. This will be explained referring to FIG. 8 and FIG. 9.

Figure 8:
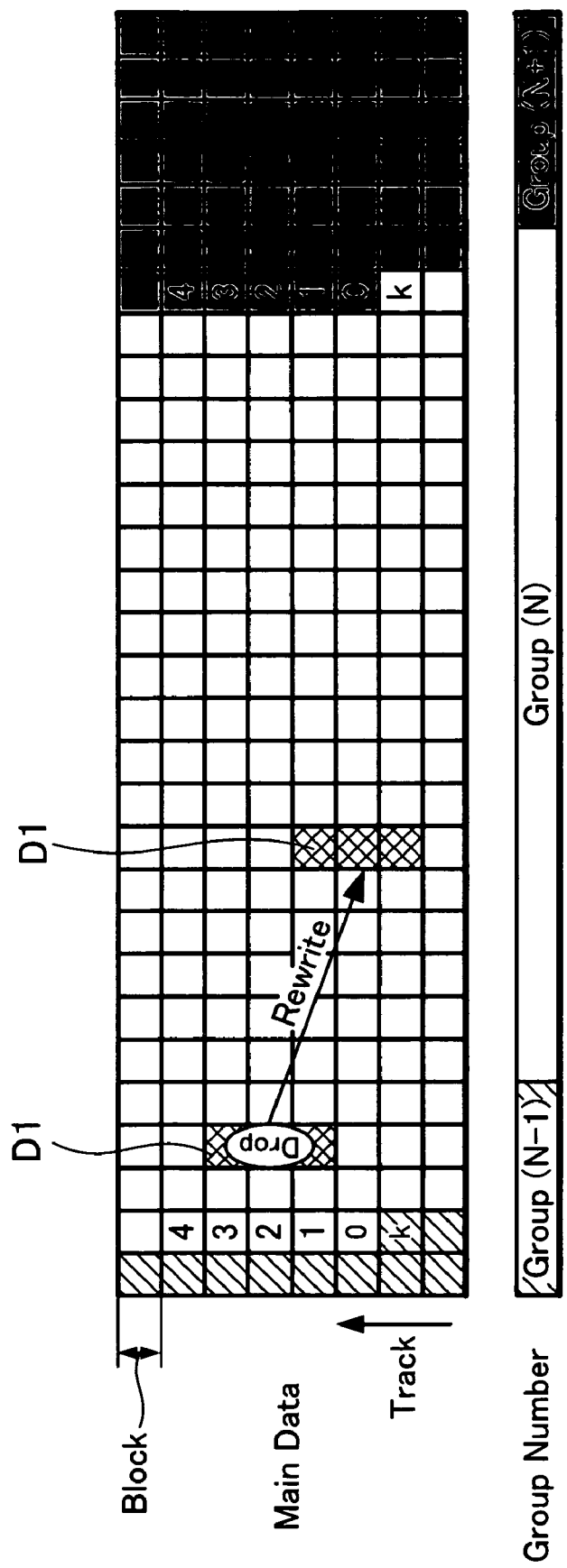
FIG. 8 is an explanatory diagram showing an embodiment of rewrite operation according to the present invention.

In FIG. 8, the main data recorded on the magnetic tape are shown schematically. Of the main data shown in the drawing, one square corresponds to one block. One track is formed by an aggregate of one column of blocks, aligned in the vertical direction in the drawing. The numbers 0 to k shown in the blocks indicate the data IDs assigned to the individual blocks. As explained above, data IDs are ID numbers assigned in sequence to the blocks within a group.

Below the main data, groups are indicated by base group numbers in the ID information.

In this case, the final block k of group (N−1) is recorded, and recording is then begun from block 0 of group (N). Then, supposing, as shown in the drawing, that a recording error has occurred for the data of three successive blocks D1. In this case also, as the read-after-write operation, reading of the block data D1 is performed, the recording error is detected, and some time is required before the rewrite operation begins. In this case, as shown in the drawing, rewriting of the block data D1 is performed again at, for example, seven tracks ahead of the position of the block data D1 at which the recording error has occurred.

This FIG. 8 shows a case where rewriting is performed within a range in which blocks in the same group are aggregated.

Figure 9:
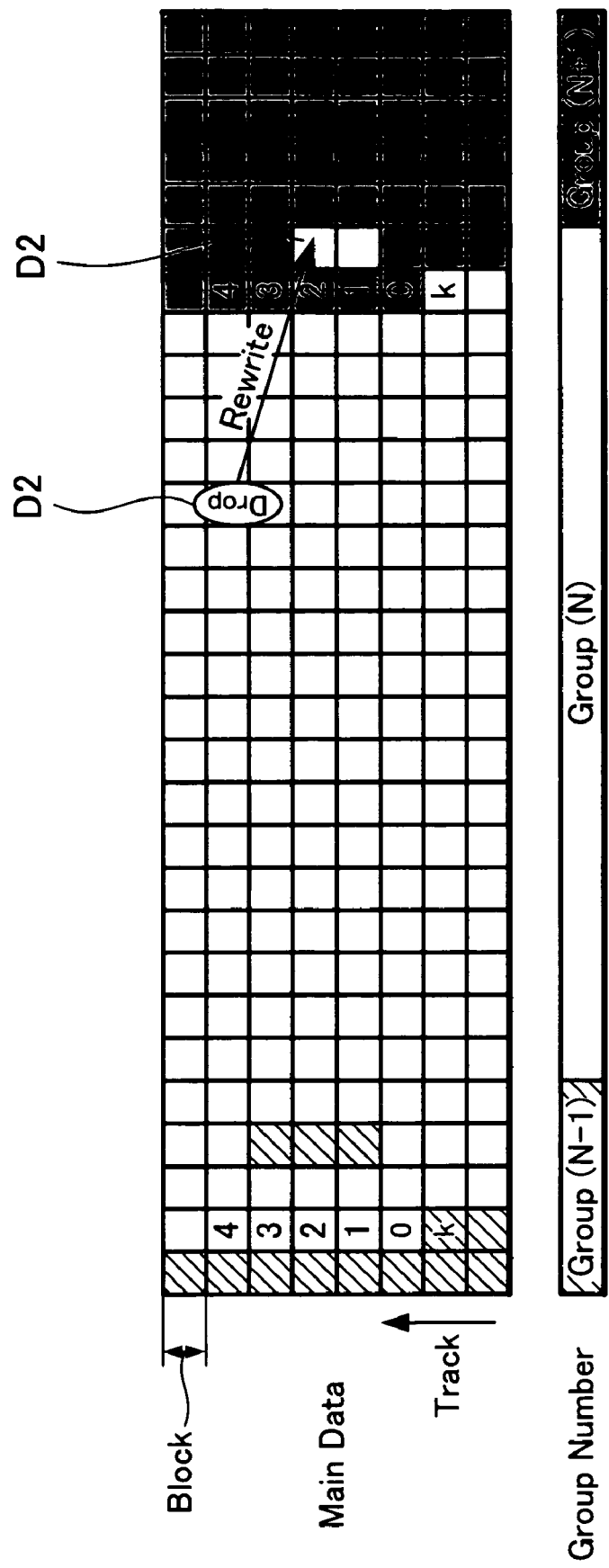
FIG. 9 is an explanatory diagram showing an embodiment of rewrite operation according to the present invention.

An example of a case in which rewriting is performed near a group boundary is illustrated in FIG. 9.

For example, as shown in the figure, supposing that during writing of a block belonging to the group (N), a recording error occurs for the block data D2 of two successive blocks. Then, in this case, after the end of writing to the final block k belonging to group (N), during writing of block data belonging to the successive group (N+1), read-after-write leads to rewriting of the block data D2.

In this case also, as shown in the drawing, rewriting is not performed in track units, but is performed only on blocks in which recording errors have occurred.

According to the format previously explained using FIG. 4, for example in FIG. 8, the block data D1 for which a recording error has occurred and the block data written in a rewrite operation have the same data ID. On the other hand, the fragment ID of the block data D1 for which a recording error has occurred and the fragment ID of the block data D1 written in the rewrite operation should be written with different values, according to the positions of actual recording in the track.

With respect to this, as shown in FIG. 9, the situation is similar when rewriting is performed spanning groups.

Insofar as rewriting of data is performed in block units, the boundary between the current group and the preceding group need not be a track. That is, as shown in FIG. 8 and FIG. 9, if the final block k of a group (N) is written in the midst of a certain track, in the remaining area of the track, data are written from the beginning block 0 of the following group (N+1).

However, because the format permits rewriting in block units as described above, a recorded state may occur, as shown in particular in FIG. 9, in which a block belonging to the immediately preceding group is intermixed within blocks belonging to a certain group. There is the further possibility of a state in which, in a given track, the boundary blocks of preceding and following groups may exist. In other words, when considered in track units, a state may occur in which blocks belonging to a plurality of different groups are intermixed.

In consideration of the fact that such a recorded state may occur, it is necessary to be able to specify, by units of the blocks forming a single track, to which group each block belongs.

Hence in this embodiment, the block header structure shown previously in FIG. 4 is employed. That is, as the logical address, instead of a data ID, the lower four bits of the group number are stipulated. Management of recorded data using the lower four bits of the group number is explained with reference to FIG. 10.

In this drawing, for example, as the result of rewriting a block belonging to group (N), both blocks belonging to group (N), and blocks belonging to group (N+1) are intermixed and recorded in the two tracks c and d, as shown.

Figure 10:
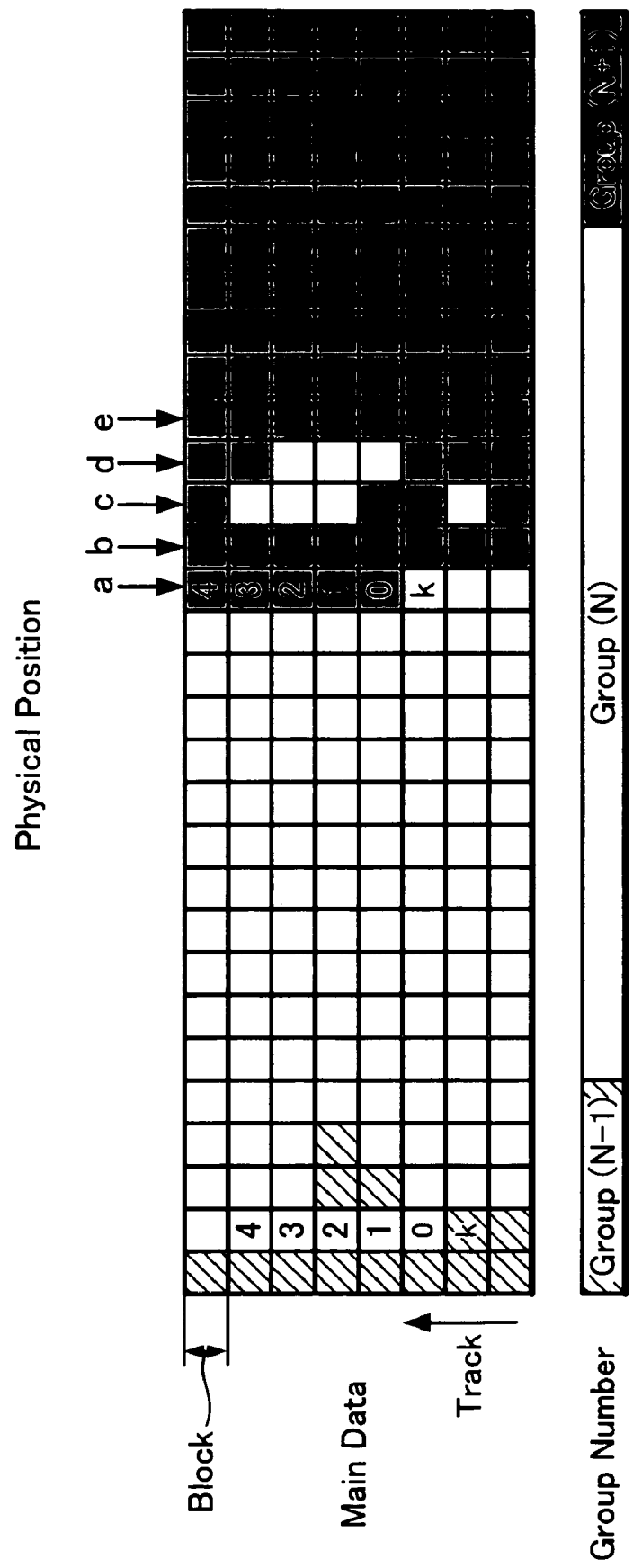
FIG. 10 is an explanatory diagram to explain processing for group specification for each block according to an embodiment of the present invention.

Further, in the drawing the group number indicating the base group number of the ID information recorded for each track is shown. In this embodiment, the base group number always indicates a single group number for an aggregate of successive tracks, as shown in FIG. 10. Restated, in successive tracks there is never storage of base group number values with the preceding and following group numbers interchanged.

Also, even if there is a track in which blocks of the following group are recorded, until recording of blocks belonging to the group indicated by the base group number ends, the group number of the current group is indicated.

In the case of FIG. 10, the group number (N) indicated by the base group number should always include up to track d, in which are physically recorded final blocks of the group (N) on the magnetic tape. Here, depending on the base group number, data up to track e in succession to track d is handled as group (N).

In this embodiment, a base group number indicates, in track units, the group number to which blocks belong, and indicates the range of a group physically set on the magnetic tape. Hence as is obvious from FIG. 10, the group number indicated by the base group number may differ from the group to which respective blocks logically belong.

Then, the number of the group to which the block logically belongs is stored in the lower four bits of the group number stored in each block shown in FIG. 10.

In this manner, by stipulating the lower four bits of the group number together with the base group number as ID information, it is possible for example to uniquely identify the group to which each block belongs using the following formula.

---

If (base group number [3:0] == lower 4-bit of group number [3:0]) {
  block group number = Base Group Number;
  } else if (Base Group Number [3:0] + 1) == Lower 4-bit of group number [3:0]) {
  block group number = base group number + 1
  } else {
  indeterminate
  }

---

However, no block is recorded at a position removed by two groups. That is, a block belonging to group (N) is assumed to be recorded in the group (N−1) indicated by the base group number of the ID information or in a track as group (N−1).

Based on the above formula, an example of identification of the group to which a block belongs is explained, referring again to FIG. 10.

For example, in the tape streamer drive 10, suppose that track a is being reproduced. On the track a, in succession to the blocks k−2, k−1, and k belonging to group (N), the blocks 0, 1, 2, 3, and 4 belonging to the following group (N+1) are recorded.

The base group number of the ID information for this track a indicates that the group is group (N). Then, in the blocks k−2, k−1, k of the track a, the lower four bits of each group number indicate the lower four bits of the group (N). Hence, because the lower four bits of the base group number of each of the blocks k−2, k−1, k coincide with the lower four bits of the group number, these blocks k−2, k−1, k are identified as blocks belonging to the group (N).

On the other hand, the lower four bits of each of the group numbers of the blocks 0, 1, 2, 3, and 4 of track a indicate the lower four bits not of group (N), but of group (N+1). However, the base group number of the ID information for track a indicates group (N). Hence in this case, the lower four bits of the base group number and those of the group number do not coincide.

According to the above formula, blocks the lower four bits of the group number of which do not coincide with the base group number are determined to belong to the group the value of which is represented by the base group number plus one. Further, this rule is applied to the blocks 0, 1, 2, 3, and 4 of track a, so that the base group number+1=group (N)+1=group (N+1), so that these blocks are determined to belong to the group (N+1).

Hereinafter, by similarly applying the above formula, it is determined that the blocks forming the next track b all belong to the group (N+1).

Furthermore, for the next tracks c and d, it is determined that blocks inserted due to rewriting are blocks of group (N), and that the remaining blocks belong to group (N+1).

Further, the blocks forming track e which follows track d likewise can be determined to all belong to group (N+1).

Figure 11:
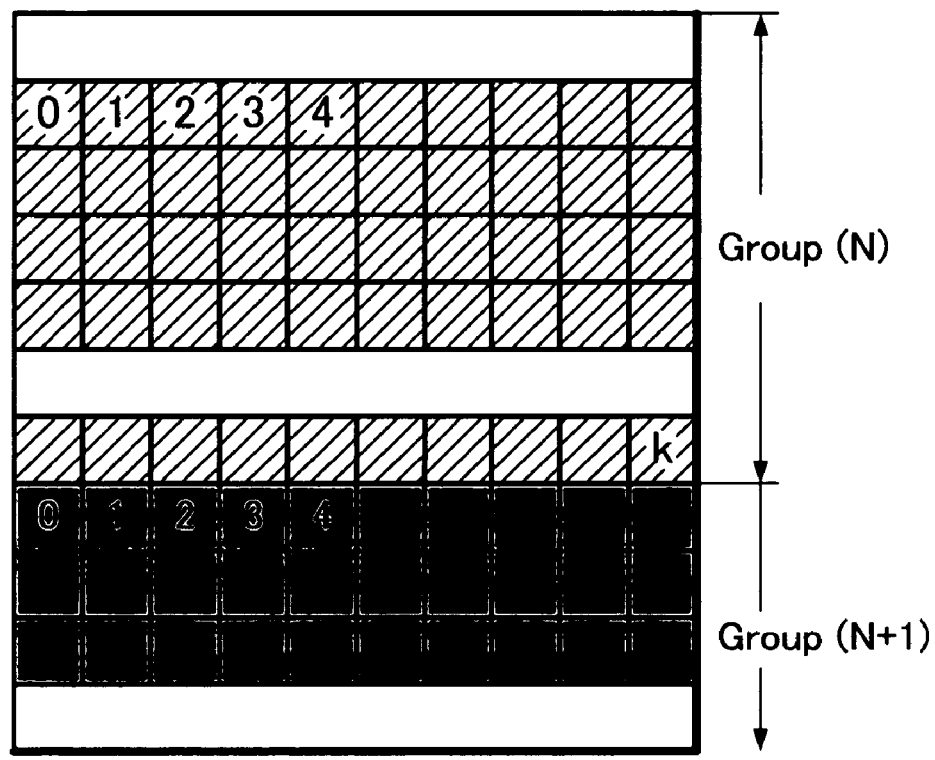
FIG. 11 is an explanatory diagram showing an example of the group structure formed by logically aggregated blocks.

Thus, according to this embodiment, it can be accurately determined to which group each block in a track logically belongs. Further, the data for each block, the group of which is determined in this way, can for example be repositioned in data ID order in memory, so that for example as shown in FIG. 11, one group can be formed through logical block arrangement.

The use of four bits in the group number information as the logical address (the lower four bits of the group number) is merely one example, to which this invention is not limited.

For example, in this embodiment it is stipulated that a given block is not recorded at a physical location on the tape separated by two groups' worth of data. Consequently in comparisons with the base group number of the ID information, it is sufficient that, in logical terms, the lowest bit of the group number information as the logical address be present. However, in order to obtain more reliable comparison results, it is desirable that a certain margin be provided with regard to the number of bits. However, making the number of bits too great increases redundancy and so is undesirable.

Hence in this embodiment, this matter is taken into consideration in employing the lower four bits as the group number information used as the logical address (the lower four bits of the group number). By this means a balance is struck between the need for more complete comparison results, and the need to avoid increased redundancy.

This invention is not limited to the configuration of the embodiment heretofore explained. That is, application is possible if tracks are formed from aggregates of data corresponding to blocks, and if formats are supported in which recording data units equivalent to groups are stipulated as data equivalent to a predetermined number of tracks.

INDUSTRIAL APPLICABILITY

According to this invention, as the basic format for recording of data onto magnetic tape, tracks are formed as successions of block units. Further, a data unit called a group is formed from data of size equivalent to a predetermined plurality of tracks.

Given such a format, physical group identification information (the base group number in ID information), which indicates the group to which the current track physically belongs, is recorded within the track data, and logical group identification information (the lower four bits of the group number), which uses a smaller number of bits than the above physical group identification information to indicate the group to which the current block logically belongs, is recorded in the above blocks.

Hence by comparing the physical group identification information and the logical group identification information during reproduction, it is possible to accurately determine to which group the data in each block belongs.

For example, when rewriting is performed in block units, a recorded state may occur in which blocks of the preceding group are intermixed in the physical area of a certain group; however, by application of this invention, even when reproduction of a magnetic tape in such a recorded state is performed, the group to which each of the blocks belongs can be identified, and group data can be formed normally. This signifies that the operation of performing rewriting in block units is actually possible. Furthermore, by this means, a block which is the end of certain group can be at a position midway in a certain track.

Thus in this invention, greater freedom is afforded in the format of recorded data, including rewriting and group switching. Further, even if a situation occurs in which blocks of different groups are intermixed and recorded within a certain recording area, the group to which each block belongs can be determined accurately, so that the reliability of recording and reproduction is improved.

The invention claimed is:

1. A recording medium, in which data are recorded on magnetic tape, comprising:
    data recorded to form tracks comprising a plurality of blocks, and groups, which are recording and reproduction data units corresponding to a predetermined plurality of tracks,
    wherein physical group identification information indicating the group to which the current track physically belongs is recorded within the data of said tracks,
    wherein logical group identification information indicating the group to which the current block logically belongs is recorded, using a number of bits smaller than the number of bits of said physical group identification information, in said blocks,
    wherein in an assembly of tracks which are indicated by said physical group identification information to belong to a specific group, blocks indicated to belong to a different group from the group indicated by said physical group identification information are recorded, and
    wherein when rewriting blocks of a predetermined track, blocks storing logical group identification information indicating a group different from the group indicated by the physical group identification information stored within the data of the track are recorded.

2. The recording medium according to claim 1, wherein said trcks are recorded helically on magnetic tape.

3. A recording method in which data are recorded on magnetic tape, comprising:
    recording data to form tracks comprising a plurality of blocks, and groups, which are recording and reproduction data units corresponding to a predetermined plurality of tracks,
    wherein physical group identification information indicating the group to which the current track physically belongs is recorded within the data of said tracks,
    wherein logical group identification information indicating the group to which the current block logically belongs is recorded, using a number of bits smaller than the number of bits of said physical group identification information, in said blocks,
    wherein when recording an assembly of tracks, which are indicated by said physical group identification information to belong to a specific group, blocks which are indicated to belong to a different group from the group indicated by said physical group identification information are recoded,
    wherein when recording a predetermined track, physical group identification information indicating a specific group is recorded within the data of said predetermined track, and
    wherein when rewriting a predetermined block within the predetermined track, recording logical group identification information indicating a group different from the group indicated by the physical group identification information.

4. The recording method according to claim 3, wherein said tracks are recorded helically on magnetic tape.

5. A recording and reproduction apparatus, which records data on magnetic tape, comprising:
    recording means for recording data to form tracks comprising a plurality of blocks, and groups, which are recording and reproduction data units corresponding to a predetermined plurality of tracks,
    wherein the recording means performs recording to store physical group identification information, indicating the group to which the current track physically belongs, in the data of said track,
    wherein the recording means performs recording to store, within said blocks, logical group identification information to indicate, using a number of bits smaller than the number of bits of said physical group identification information, the group to which the current block logically belongs,
    wherein when said recording means records an assembly of tracks indicated by said physical group identification information that the tracks belong to a specific group, blocks storing logical group identification information indicating that the blocks belong to a group different from the group indicated by said physical group identification information are recorded,
    wherein when recording a predetermined track, said recording means records physical group identification information indicating a specific group within the data of said predetermined track, and
    wherein when rewriting a predetermined block within the predetermined track, said recording means records logical group identification information indicating a group different from the group indicated by physical group identification information.

6. The recording and reproduction apparatus according to claim 5, wherein said tracks are recorded helically on magnetic tape.

* * * * *